United States Patent [19]

Williams

[11] Patent Number: 4,511,020

[45] Date of Patent: Apr. 16, 1985

[54] DISC BRAKES

[75] Inventor: Francis V. Williams, Solihull, England

[73] Assignee: Lucas Industries Limited, Birmingham, England

[21] Appl. No.: 401,557

[22] Filed: Jul. 26, 1982

[30] Foreign Application Priority Data

Aug. 4, 1981 [GB] United Kingdom ............... 8123757

[51] Int. Cl.³ ............................................. F16D 65/02
[52] U.S. Cl. ................................................. 188/73.39
[58] Field of Search .................... 188/71.1, 72.4, 73.31, 188/73.32, 73.39, 73.43, 206 R

[56] References Cited

U.S. PATENT DOCUMENTS

3,924,711 12/1975 Hoffmann et al. ............ 188/73.39 X

Primary Examiner—Duane A. Reger
Attorney, Agent, or Firm—Scrivener Clarke

[57] ABSTRACT

The present specification relates to pin sliding caliper disc brakes suitable for use in trucks. The disc brake of the present invention comprises a caliper slidably mounted on a first torque taking member, the caliper being open-topped for the easy insertion of friction pad assemblies. A supplementary torque taking member is detachably secured to the first torque taking member and has a pair of finger-like projections which, in use, engage in complementary recesses in the friction pad assemblies whereby the pad braking force is taken directly by the torque taking members. To replace the pad assemblies, the supplementary torque taking member is detached to allow for easy access to the caliper.

11 Claims, 14 Drawing Figures

DISC BRAKES

DESCRIPTION

The present invention relates to a pin sliding caliper disc brake.

In particular the present invention relates to a sliding caliper disc brake for use in trucks, especially trucks in the medium range i.e. 4–12 tons GVW, vehicle manufacturers having a tendency towards adopting disc brakes instead of drum brakes, particularly in this medium range truck market. Disc brakes have advantages over drum brakes in terms of, for example, weight saving and stability. Further advantages are easier service ability and the ability to operate at higher temperatures than drum brakes without the "fade" problem which is inherent in drum brakes.

From the vehicle manufacturers point of view there are several features that individually or collectively are desirable when adopting a disc brake arrangement. These are as follows:

(1) For long pad life and thus longer service intervals, large volume friction pads may be required;

(2) As large a disc as possible is required in order to minimise braking temperatures and as large a disc swept area to reduce input power per unit area;

(3) An integral or ring mounted torque plate is preferred to allow for removal of the disc at major service intervals;

(4) The brake is preferably of open top design to permit withdrawal of the friction pads radially with respect to the disc, without requiring removal of the caliper; and (5) Braking force from the friction pad assemblies is required to be taken off directly by a fixed member e.g. torque plate.

A major disadvantage when thinking in terms of disc brakes for medium range trucks is the availability of space to actually install a caliper/torque plate, having all of the above features, coupled with the fact that the vehicle weight to wheel size relationship is comparable to that of heavier trucks and similar braking forces have to be met.

Certain known disc brakes for trucks, having what are termed fist or reaction type calipers, have had adequate friction pad volumes but pad changing has been a difficult operation. The caliper has had to either be swung out of the way or removed completely prior to removal of the friction pad assemblies and it can be appreciated that the calipers of such brakes are heavy and pad changing becomes a lengthy operation, see for example British Patent Specification No. 1526258, this being in comparison to smaller brakes of similar construction. This prior arrangement also provides for easier assembly and dismantling of the disc but rotation or removal of the caliper can result in the hydraulics being disturbed and the hydraulic hose can be twisted. This is of course disadvantageous and possibly dangerous.

A further prior arrangement overcomes the above disadvantages by providing an open top caliper where a fixed member, i.e. torque plate, with circumferentially spaced limbs which span the disc are arranged to take both the pad drags. Such a construction is shown in British Patent Specification No. 2034425. However, this construction suffers from a reduced pad volume and area due to the pads having to be insertable through the open caliper top. Further, although the open top design clearly provides for easier pad change, the arrangement necessary to allow for the disc itself to be removed gives little abutment area for the outboard friction pad assembly, just where one would expect high wear at the pad/abutment interface.

Also in said fist type disc brakes, where the drag taking member straddles the disc and comprises circumferentially spaced limbs, the drag taking limb can deflect under high load. Such deflection can result in the spurious loading of the sliding connection between the caliper and torque taking member, causing binding etc.

It is known in certain fist type disc brakes to arrange the drag taking member above the disc periphery and centrally with respect to the pad. Such a construction is shown in British Patent Specification No. 1424976. However, there are certain disadvantages with this arrangement. Firstly, at least part of the drag created by the outboard friction pad is taken through the caliper and thus the caliper/torque plate sliding pin connection must take some drag and this sliding connection could therefore distort and jam. Secondly, although the drag taking member is centrally positioned with regard to the pads, it lies above the disc periphery and is thus spaced from the line of drag through the effective drag radius which is situated within the disc periphery. This can lead to an undue twisting moment being applied to the friction pad assemblies when the brake is activated, and jamming can result unless special provision is made to counter this moment.

The aim of the present invention is to try to overcome the above problems whilst providing a relatively inexpensive brake giving all of the advantageous features previously outlined as being desirable in a trunk disc brake.

According to the present invention there is provided a pin sliding caliper disc brake, comprising a caliper and a first torque taking member, said caliper and first torque taking member being slidable relative to each other by means of a sliding pin connection, the caliper being open topped for the insertion of friction pad assemblies and a supplementary torque taking member being detachably secured to said first torque taking member, the supplementary torque taking member having a pair of projections which, in use, engage said friction pad assemblies and take all of the braking forces, i.e. drag forces etc. drag forces exerted on said friction pad assemblies.

Thus, by virtue of the present invention an open topped caliper design is achieved facilitating the easy replacement of friction pads and by virtue of the detachable supplementary torque taking member, the brake pads can be simply removed and the open top caliper can be designed without stress problems, to receive large volume/area friction pads. Also, and most importantly, the caliper is free of braking force, the torque taking member taking all of the braking forces. Thus the sliding pin connections between caliper and torque taking member, are free of braking force preventing any distortion and jamming, as has occurred in prior art designs of the relevant type.

In a preferred embodiment of the present invention the supplementary torque taking member has a pair of rectangular shaped fingers which project generally radially of the brake disc and engage in recesses in the backing plates of the friction pad assemblies, the backing plates having lateral shoulders which engage on support guides in the caliper. Preferably, each friction pad has a generally rectangular recess provided in the middle region of the upper edge of the backing plate, the recesses each being complementary in shape to a rectangular finger of the supplementary torque plate. The rectangular shaped fingers which take all of the friction pad braking force are preferably so positioned as to extend into the respective recesses to cover a point where all elemental braking forces i.e., drag forces, etc. may be said to be combined in a single drag force, this being below, i.e. within, the brake disc periphery. Thus by virtue of the location of the said recess in the middle region of the upper edge of the backing plate, and the rectangular shaped fingers covering the point within the periphery of the brake disc, through which all force effectively acts, no undue twisting moment is applied to the friction pad assemblies when the brake is actuated. Further, the supplementary torque taking member is preferably bolted to the first torque taking member which is preferably a ring torque plate, and thus by simply unbolting the supplementary torque taking member, easy pad replacement can be effected.

In truck disc brakes constructed according to the present invention, which incoporate mechanical or pneumatic actuators, where a relatively large assembly is supported on the caliper in contrast to a hydraulic arrangement, a third pin sliding connection is preferably provided between the caliper and the supplementary torque taking member to thus maintain the caliper in a stable position at all times as the friction pad assemblies wear. Preferably the third pin engages in the outboard finger projection of the supplementary torque taking member.

All of the pin sliding connections in any embodiment of the present invention are preferably fully sealed, this being possible as the torque plate and caliper need not be separate for servicing.

The present invention will now be further described, by way of example, with reference to the accompanying drawings, in which.

Figure 1:
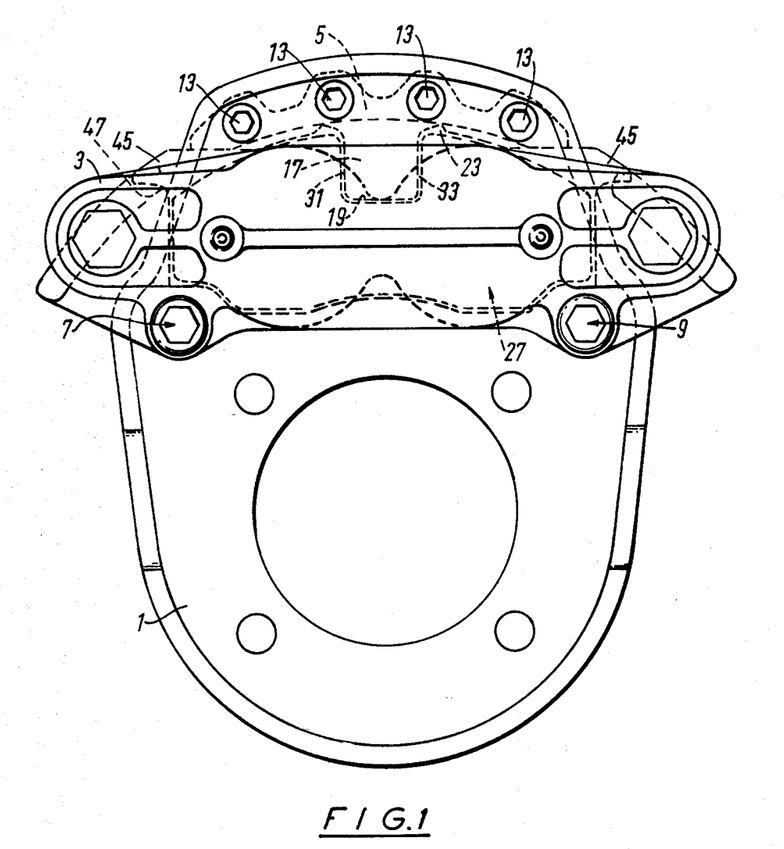
FIG. 1 is a front view of one embodiment of the present invention.
Figure 2:
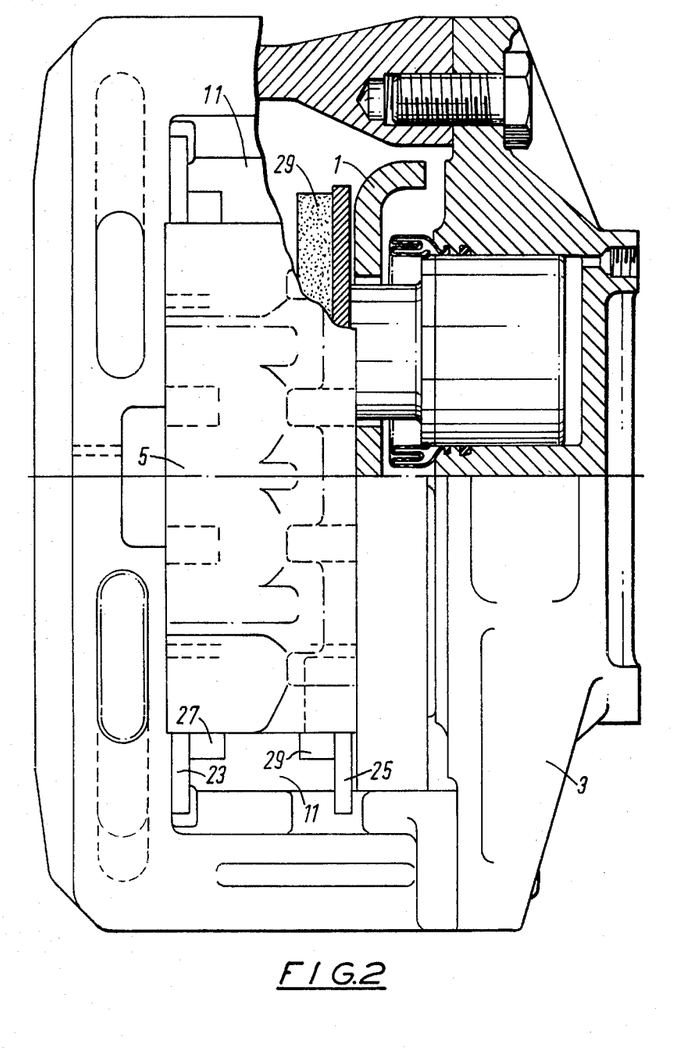
FIG. 2 is a partially cutaway plan view of the brake of FIG. 1.
Figure 3:
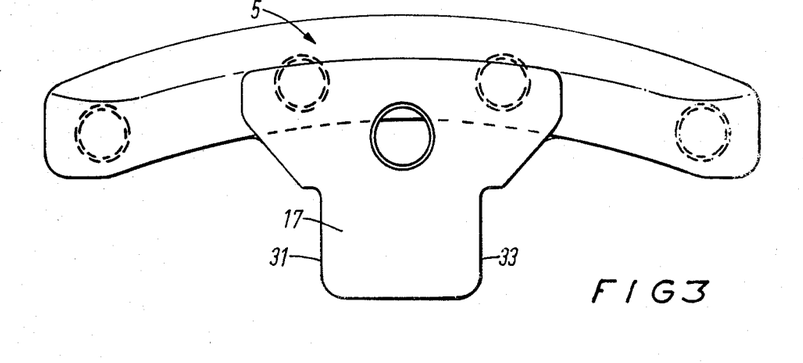
FIG. 3 is a front view of the supplementary torque taking member of FIGS. 1 and 2.
Figure 4:
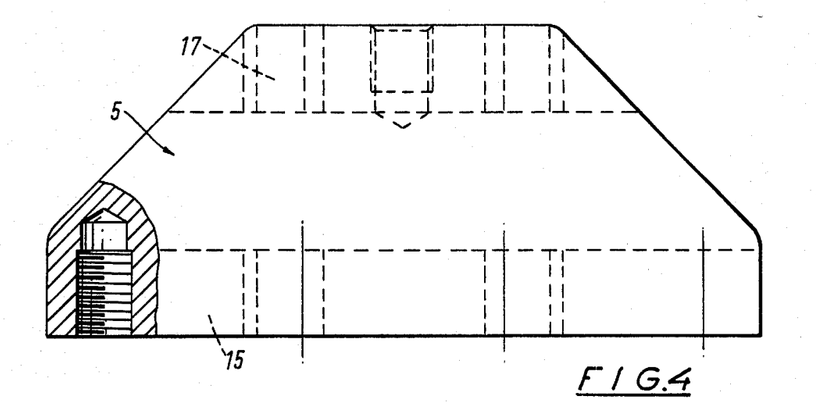
FIG. 4 is a plan view of the supplementary torque taking member of FIGS. 1 and 2.
Figure 5:
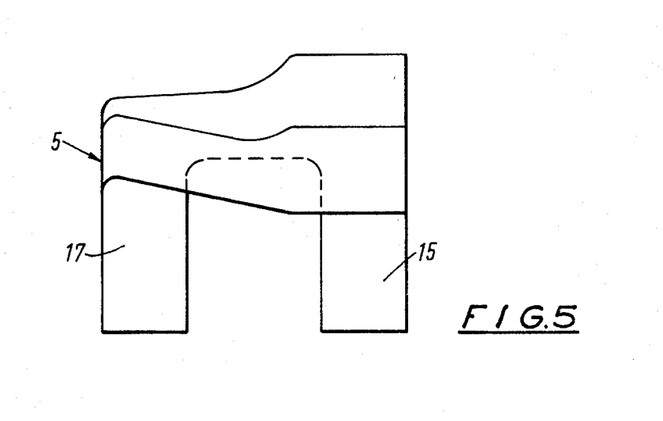
FIG. 5 is an end view of the supplementary torque taking member of FIGS. 1 and 2.
Figure 6:
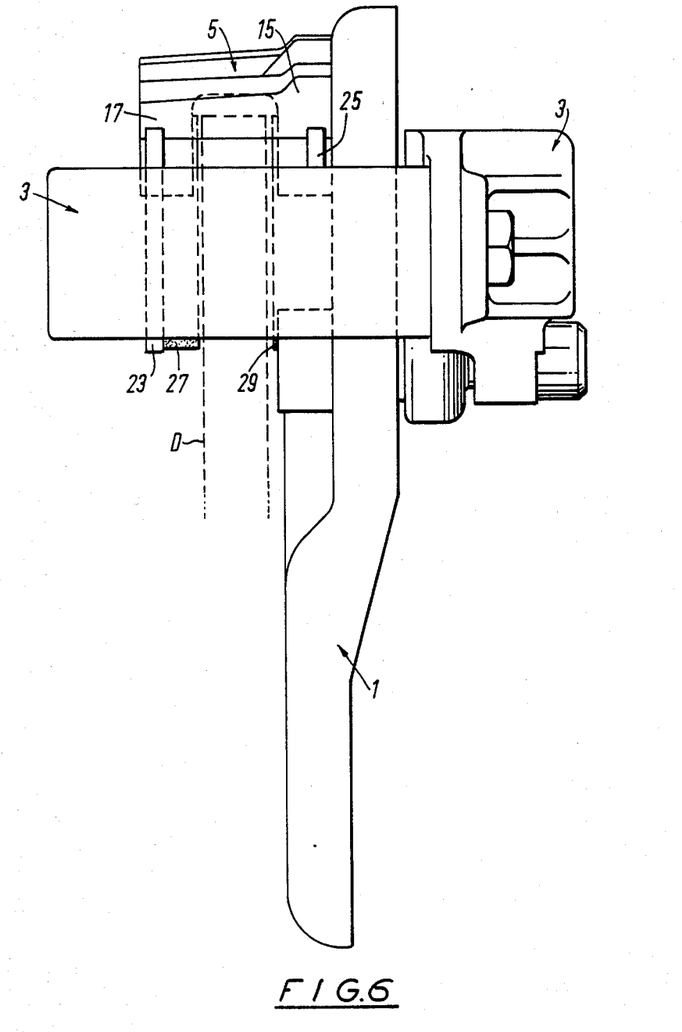
FIG. 6 is an end elevational view of the brake of FIGS. 1 and 2.
Figure 7:
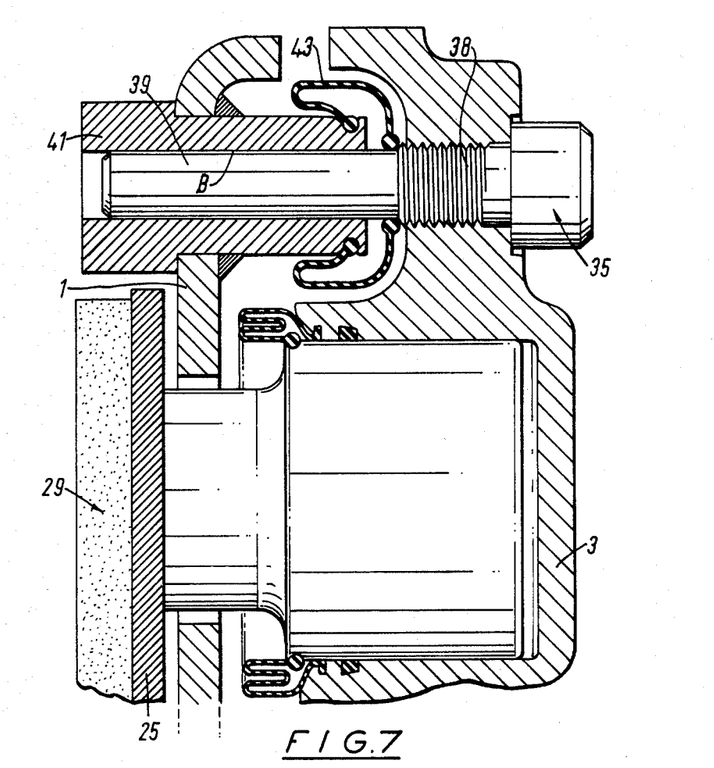
FIG. 7 is a detailed plan view in cross section of part of the brake of FIGS. 1 and 2, showing the sliding pin connection between torque plate and caliper.
Figure 8:
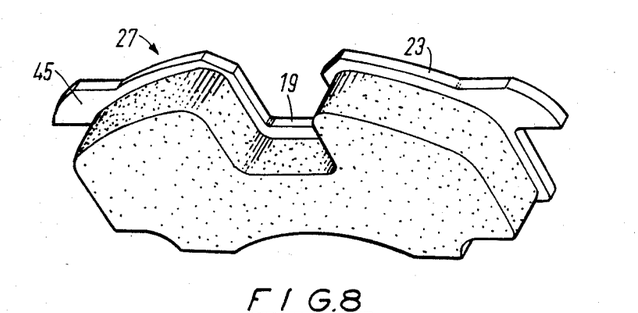
FIG. 8 is a perspective view of a friction pad assembly for use in the brake of FIGS. 1 to 7.

The disc brake constructed according to the present invention and illustrated in FIGS. 1 to 7 of the accompanying drawings comprises a ring mounted torque plate 1, a caliper 3 and a supplementary torque taking member 5. The caliper 3 is mounted by slidable pin connections 7 and 9 on torque plate 1, and is basically of open-top design as can be seen at 11 in FIG. 2. When in use the open-top 11 is virtually completely covered, again as can be seen in FIG. 2, by the supplementary torque taking member 5 which is detachably secured to torque plate 1 by bolts 13. As can be best seen in FIGS. 3, 4 and 5, supplementary torque taking member 5 has a generally inverted U-shaped transverse cross-section configuraton, with depending arms or finger-like projections 15 and 17. Each finger-like projection 15,17 is received in a complementary recess 19, in the backing plate 23,25 of a friction pad assembly 27,29 (see FIGS. 1,2 and 7), the lateral edges 31,33 of each projection 15,17 engaging the corresponding wall of a recess 19, so that the projections 15,17 take all pad force in either circumferential direction of movement. The friction pads can still slide relative to the projections 15,17 axially of the disc as pad wear occurs (see FIG. 6), but are restrained by the projections in the circumferential direction with respect to the brake disc D. Thus all of the pad drag is conveyed to the torque plate 1 via the supplementary torque taking member 5 leaving the caliper 3 and the sliding pin connections 7 and 9, free of any drag forces obviating the possibility of any distortion due to drag forces, which distortion could lead to possible dangerous brake jamming. Each pin connection 7,9 is as shown in FIG. 7 and comprises a pin 35 having a screw threaded portion 37 secured in a threaded bore 38 in caliper 3, and extension 39 of the pin 35 being slidably secured in a bore B in a sleeve 41 welded in position on torque plate 1. An annular flexible seal 43 seals the sliding pin connection. Alternatively, reverse pin connections as, for example, shown in FIGS. 13 and 14, can of course be equally well used.

It must also be noted that because the finger-like projections 15,17 project radially inwardly with respect to the brake disc they engage the friction pads at a theoretical point where all elemental braking forces can be said to be effectively combined in a single force within the disc periphery. This is clearly desirable and advantageous as it avoids or reduces undesirable moments of force.

To replace the friction pads 27,29, the supplementary torque taking member 5 is unbolted from torque plate 1, disengaged from the friction pads 27,29, and lifted clear of the brake. The friction pads 27,29 which merely rest with their lateral shoulders 45 on pad support guides 47 in caliper 3, can then be simply lifted out from the open-top caliper 3 and replaced, the supplementary torque taking member 5 being subsequently bolted back in position on the torque plate 1. Thus the caliper 3 remains in place though servicing on this truck brake can be simply carried out after removing the relatively light supplementary torque taking member 5.

Figure 9:
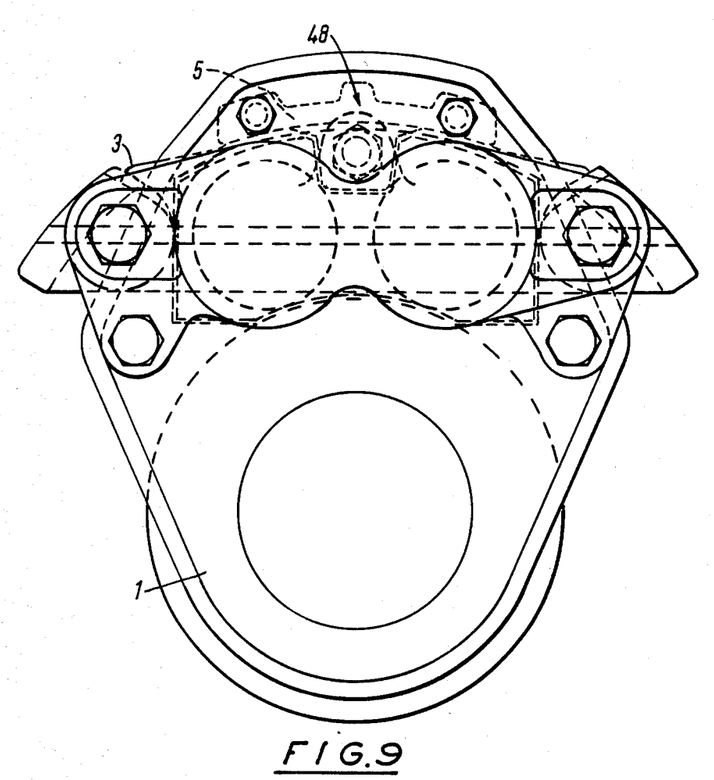
FIG. 9 is a front view of a further embodiment of the present invention.
Figure 10:
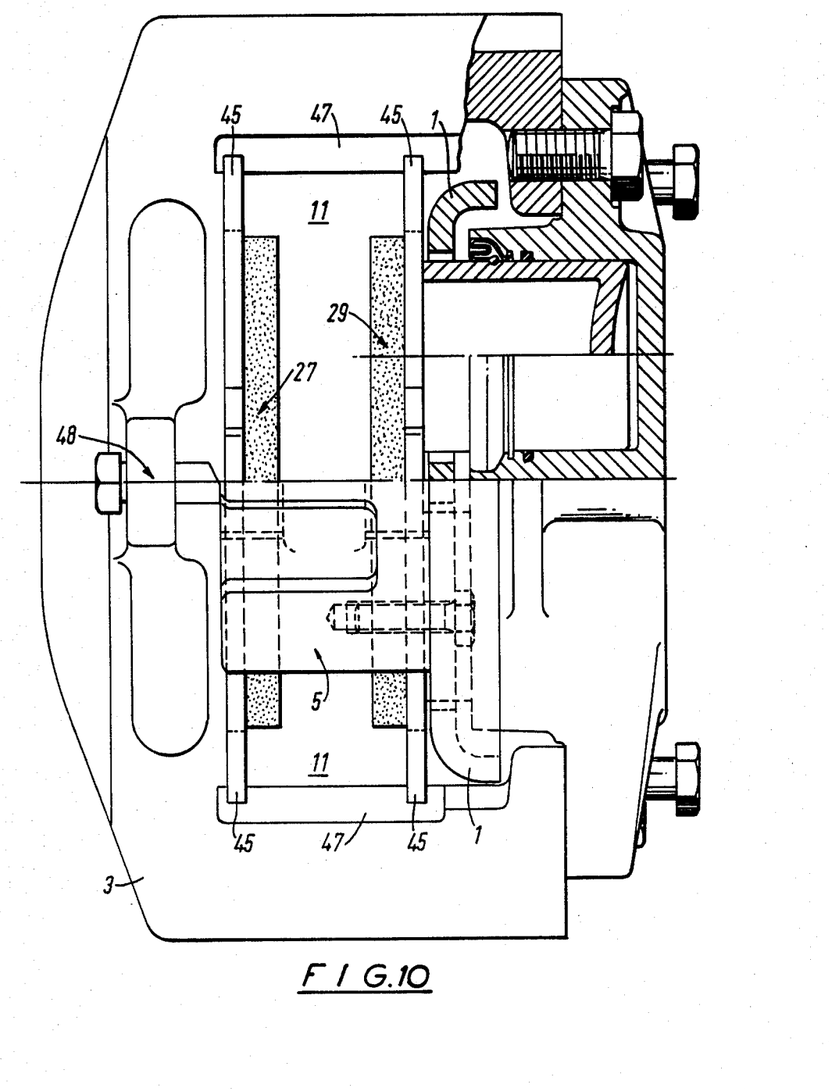
FIG. 10 is a partially cutaway plan view of the brake of FIG. 9.
Figure 11:
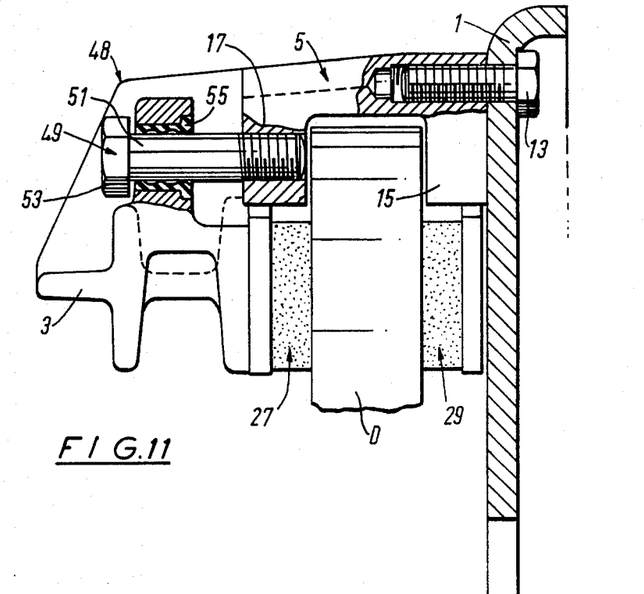
FIG. 11 is a cross-sectional view of the brake of FIGS. 9 and 10.

FIGS. 9, 10 and 11 of the accompanying drawings show a modified form of the disc brake of FIGS. 1 to 8 and equivalent component parts to those shown in FIGS. 1 to 7, are identified by the same reference numerals.

The main difference between the disc brake of FIGS. 9, 10 and 11 and the brake of FIGS. 1 to 8, are that the brake of FIGS. 9, 10, 11 is a reverse pin slider, i.e. the sliding pins connecting the torque plate 1 and caliper 3, are secured to the torque plate 1, whereas the brake of FIGS. 1 to 8 is a forward pin slide, and also the brake of FIGS. 9, 10 and 11 is provided with a third sliding pin connection 48 at the outboard side of the brake to maintain the caliper steady, the caliper 3 being designed for mechanical or pneumatic actuation and therefore having to carry the heavy actuation assembly (not shown) not necessary on the hydraulic brake of FIGS. 1 to 8. This third pin connection 48 therefore maintains the caliper 3 stable irrespective of pad wear and the position of the caliper 3 with respect to torque plate 1.

Figure 12:
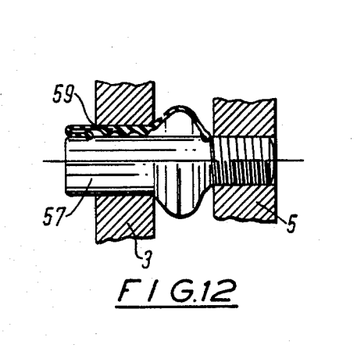
FIG. 12 shows an alternative construction for the third pin of the brake of FIGS. 9 and 10.

The construction of this third pin connection 48 is best seen in FIG. 11, the connection comprising a pin which is in the form of bolt 49, the shank 51 of bolt 49 passing through bore 53 in part of caliper 3 and being screwed into outboard finger-like projection 17 of the supplementary torque taking member 5. Bore 53 is lined by bushing 55 which protects the sliding surface on shank 51. An alternative form of pin and seal for this third pin connection is shown in FIG. 12. In this alternative, the pin is merely a shaft 57, no bolt head being provided, the shaft 57 being screwed into the supplementary torque taking member 5. A bush 59 lines bore 53 but has flexible extensions which grip the shaft 57 beyond the bore 53 to thereby more effectively protect the sliding surface of the pin connection.

Figure 13:
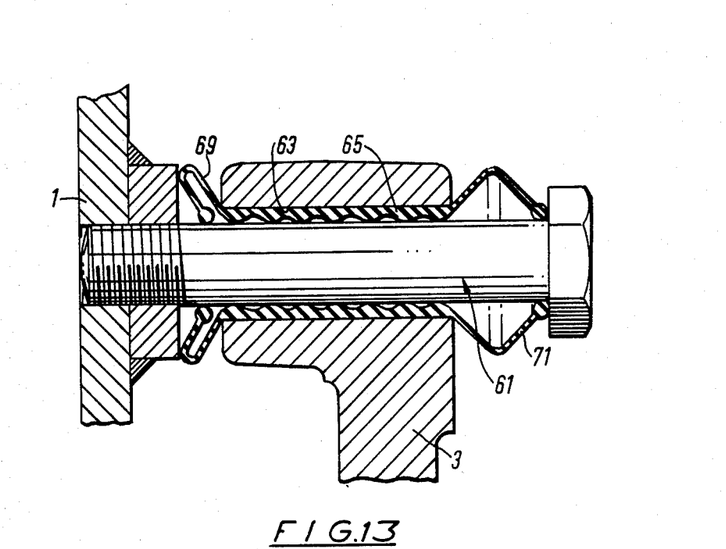
FIG. 13 shows one alternative embodiment of a fully sealed sliding pin connection between torque plate and caliper, suitable for the brake of the present invention.
Figure 14:
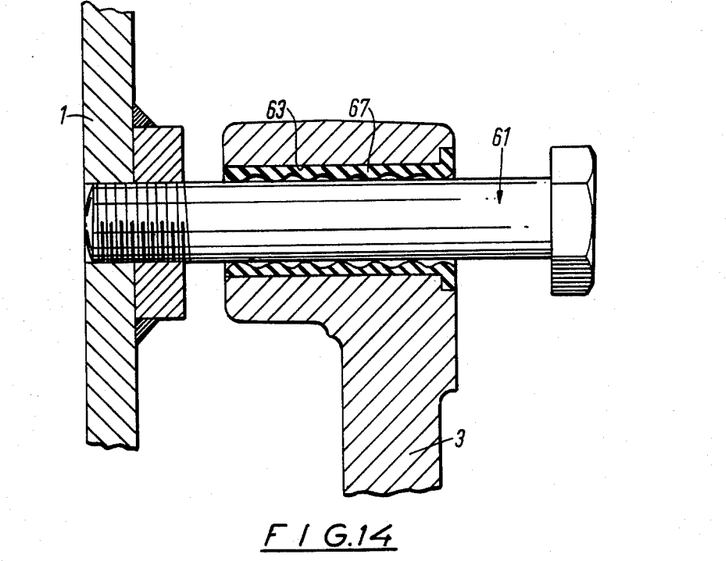
FIG. 14 shows a further alternative embodiment of a fully sealed sliding pin connection between torque plate and caliper, suitable for the brake of the present invention.

FIGS. 13 and 14 merely show two reverse pin slider sliding connections for interconnecting the torque plate 1 and caliper 3, the sliding connections each comprising a pin 61 which is screwed into torque plate 1 and on which caliper 3 is slidable, the bore 63 in caliper 3 for receiving pin 61, being lined with a bush 65 in FIG. 12 and 67 in FIG. 13. Bush 65 (FIG. 13) has flexible extensions 69 and 71 which grip the pin surface beyond bore 63 and thereby offer complete protection for the sliding surfaces, whereas bush 67 (FIG. 14) is restricted to bore 63.

The above embodiments of the present invention provide a truck brake with virtually all of the required advantages initially listed, the major features being that the sliding caliper is free of braking force and that, by virtue of the illustrated construction, the drag is taken at the theoretical point where all elemental braking forces drag forces, etc. effectively act as a single force.

While the above embodiments of the present invention are of twin pin slider construction, the present invention is equally well applicable to any desired alternative construction of pin sliding disc brake.

I claim:

1. A pin sliding caliper disc brake, comprising a caliper and a first torque taking member, said caliper and first torque taking member being slidable relative to each other by means of a sliding connection, the caliper being open-topped for the insertion of friction pad assemblies, and a supplementary torque taking member detachably secured to said first torque taking member, said supplementary torque taking member having a pair of projections each of which, in use, engages a friction pad assembly at a position where said projection takes all of the braking forces exerted on said friction pad assembly while relieving said caliper of braking forces, said pair of projections being in the form of shaped fingers which project generally radially of the brake disc, one on either side thereto, and engage in recesses in the friction pad assemblies.

2. A disc brake according to claim 1, wherein the friction pad assemblies each comprise a generally planar backing plate to which a pad of friction material is secured, each of said fingers engaging in a recess in the middle region of what is, in use, the upper edge of the backing plate.

3. A disc brake according to claim 2, wherein the fingers and recesses are complementarily shaped.

4. A disc brake according to claim 3, wherein the fingers and recesses are generally rectangular.

5. A disc brake according to any one of claims 2, 3 and 4, wherein the caliper includes pad guides, and the backing plate has laterally projecting shoulders which engage said guides.

6. A disc brake according to any one of claims 1 to 4, wherein the fingers extend into the recesses in the friction pad assemblies, sufficiently for enough to cover a theoretical point within the periphery of the brake disc, through which the total pad brake force effectively acts.

7. A disc brake according to claim 1, wherein the first torque taking member is in the form of a ring shaped torque taking member, the supplementary torque taking member being bolted thereto.

8. A disc brake according to claim 1, wherein a third sliding pin connection is provided, this latter connection being between the caliper and the supplementary torque taking member.

9. A disc brake according to claim 8, wherein the third sliding pin connection is between the caliper and an outboard projection of the supplementary torque taking member.

10. A disc brake according to claim 1, wherein said sliding connection comprises a pin secured to the caliper and axially slidably received in a bore provided in said first torque taking member.

11. A disc brake according to claim 1, wherein said sliding connection comprises a pin secured to the said first torque taking member and axially slidably received in a bore provided in the caliper.

* * * * *